United States Patent
Thompson et al.

(10) Patent No.: US 6,873,355 B1
(45) Date of Patent: Mar. 29, 2005

(54) THREE-DIMENSIONAL MOVING CAMERA ASSEMBLY WITH AN INFORMATIONAL COVER HOUSING

(75) Inventors: Roland R. Thompson, Malvern, PA (US); Michael S. Blackstone, Downington, PA (US)

(73) Assignee: SkyCam, LLC, Tulsa, OK (US)

( * ) Notice: Subject to any disclaimer, the term of this patent is extended or adjusted under 35 U.S.C. 154(b) by 802 days.

(21) Appl. No.: 09/130,807

(22) Filed: Aug. 7, 1998

(51) Int. Cl.[7] .............................................. H04N 7/18
(52) U.S. Cl. ...................................... 348/144; 348/157
(58) Field of Search .............................. 348/144, 157, 348/61, 143, 151, 376; 273/440, 402; 340/323 R; 345/419; 472/94; H04N 7/18

(56) References Cited

U.S. PATENT DOCUMENTS

| | | | | |
|---|---|---|---|---|
| 4,625,243 A | * | 11/1986 | Takubo | 348/376 |
| 4,710,819 A | * | 12/1987 | Brown | 348/144 |
| 4,715,598 A | * | 12/1987 | Knight | 472/94 |
| 5,333,257 A | * | 7/1994 | Merrill et al. | 345/467 |
| 5,341,121 A | * | 8/1994 | Rada | 340/323 R |
| 5,531,453 A | * | 7/1996 | Penston, III | 273/440 |
| 5,600,368 A | * | 2/1997 | Matthews, III | 348/143 |

* cited by examiner

*Primary Examiner*—Young Lee
(74) *Attorney, Agent, or Firm*—Thomas A. Corrado; Kilpatrick Stockton LLP

(57) ABSTRACT

A three-dimensionally moveable camera system, including at least three elongated flexible members, at least three motor driven reels for expanding and retracting the flexible members, at least three equipment support members attached to the flexible members, and a three-dimensionally moveable camera assembly including a movable camera mount connected to the equipment support members, a camera, a cover that conveys advertising information to spectators, and control electronics which control an angular orientation of the moveable assembly including the cover. The cover may be in the form of a polygon or a mold.

17 Claims, 4 Drawing Sheets

THREE-DIMENSIONAL MOVING CAMERA ASSEMBLY WITH AN INFORMATIONAL COVER HOUSING

CROSS REFERENCE TO RELATED APPLICATIONS

The present application expressly incorporates herein by reference, in its entirety, U.S. Pat. No. 4,710,819, entitled "Suspension System For Supporting And Conveying Equipment, Such As A Camera."

BACKGROUND OF THE INVENTION

1. Field of the Invention

The present invention is directed generally to an informational camera apparatus and, more particularly, to a three-dimensionally moveable camera with an informational cover housing.

2. Description of the Background

In general, information is provided to spectators at a sporting event through scoreboards and billboards mounted to the infrastructure of the stadium in which the event occurs. Due to the necessities of stadium design, limited space is available for the placement of scoreboards and billboards, and scoreboards and billboards are often installed at the expense of seating areas.

Spectators not physically present at a sporting event may nonetheless recieve information from the event by receiving a broadcast signal of occurrences at the stadium as relayed by a series of cameras which, like the scoreboards and billboards, are placed within the stadium. An improved overview of the information available to spectators not physically present has been achieved through the use of movable cameras suspended above the event. However, the best suspended or stationary camera views may be obstructed by scoreboards or billboards, and, conversely, the best placement of a scoreboard or billboard for viewing of the scoreboard or billboard may be unavailable due to placement of a camera at that location.

Therefore, the need exists for a moving camera that provides a broadcast feed while simultaneously providing a location for the providing of information to spectators.

BRIEF SUMMARY OF THE INVENTION

The present invention is directed to an apparatus for providing information to spectators not physically present at a sporting event, as well as spectators physically present at the sporting event. More particularly, the present invention is directed to a three-dimensionally moveable camera assembly having an informational cover housing.

In one embodiment of the present invention, the moving camera assembly with informational cover housing includes at least three elongated flexible members, at least three motor driven reels for extending and retracting the flexible members, at least three equipment support members attached to the flexible members, a camera mount, including a movable camera for broadcasting information from a sporting event to spectators not physically present, control electronics connected to a remote control system, which control and power the movable camera, and a cover housing, placed around the control electronics and conveying information to spectators at the sporting event. The cover housing may be in the form of a polygon or a mold. The information conveyed may be in the form of game scores, statistics, or advertising.

In another embodiment of the present invention, the movement of the camera assembly with informational cover housing is controlled by software which activates the motor driven reels. The software may also control the information displayed on the cover housing.

The present invention solves problems experienced with the prior art because it combines a suspended camera with an informational service, thereby saving on space used within a stadium by providing the best view of the event to spectators watching the broadcast while providing the best view of information to spectators within the stadium. Those and other advantages and benefits of the present invention will become apparent from the description of the preferred embodiments hereinbelow.

BRIEF DESCRIPTION OF THE SEVERAL VIEWS OF THE DRAWING

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical camera or informational system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
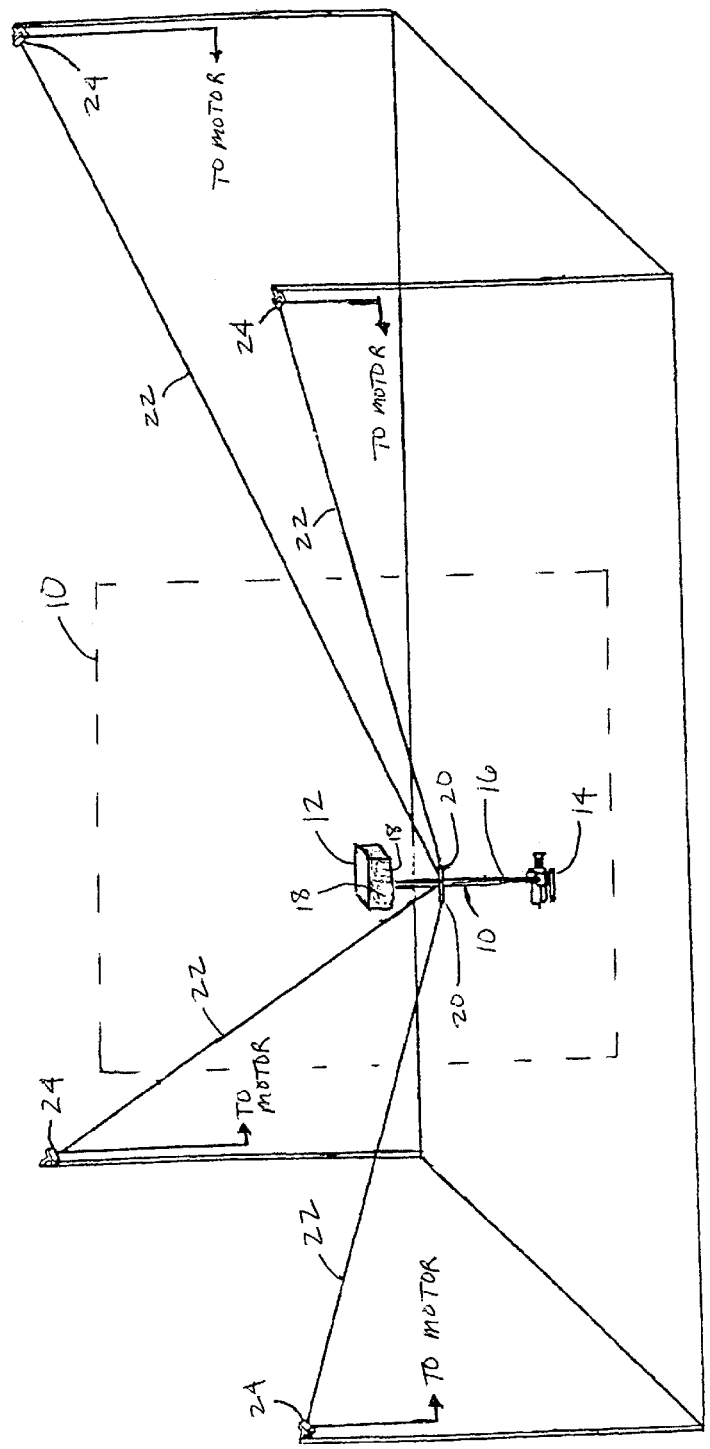
FIG. 1 is a schematic view illustrating the three-dimensionally moveable camera assembly with informational cover housing.

FIG. 1 is a schematic view of the three-dimensionally moveable camera assembly 10 with an informational cover housing 12.

The camera assembly 10 includes a camera 14, a movable mount 16 to which the camera 14 attaches, control electronics 18 which control the camera 14 and attach to the mount 16, equipment supports 20 which attach to the mount 16, and elogated flexible members 22 tied to the equipment supports 20 on which elongated flexible members 22 the camera 14, mount 16, and control electronics 18 are suspended. The camera assembly 10 is moved by a set of motor reels 24, which connect to the elongated flexible members 22 and expand and retract the elongated flexible members 22. The activation of the motor reels 24 may be controlled by various means, such as a timer or a software algorithm. The software algorithm used in the present invention calculates the distance to be moved by the camera assembly 10, the number of rotations of the reels 24 and the reel locations needed to move that distance, and then communicates that information to motors which in turn activate the motor driven reels 24. The software algorithm used in the present embodiment is incorporated into a controlling software program.

When the motor reels 24 expand or retract the elongated flexible members 22, the camera assembly 10 is moved a distance which corresponds to the amount which the elongated flexible members 22 are expanded or retracted by the reels 24. Operations by which the camera assembly 10 may be moved by expanding and retracting of the motor reels 24, as well as the interconnection of the motor reels 24, equipment support members 20, camera 14, movable mount 16, control electronics 18, and elogated flexible members 22, are substantially described in U.S. Pat. No. 4,710,819, issued to Brown, which is herein incorporated by reference.

The informational cover housing 12 is connected to the camera mount 16 and surrounds the control electronics 18. The cover housing 12 may be rigidly connected by methods known in the art, such as but not limited to glue, screws, nuts, or nails, or may be rotatably connected by methods known in the art such as, but not limited to a ball bearing, a rack and pinion, a spring, a cylinder, or a rotating arm. The cover housing 12 is discussed in greater detail below with respect to FIG. 3.

Figure 2:
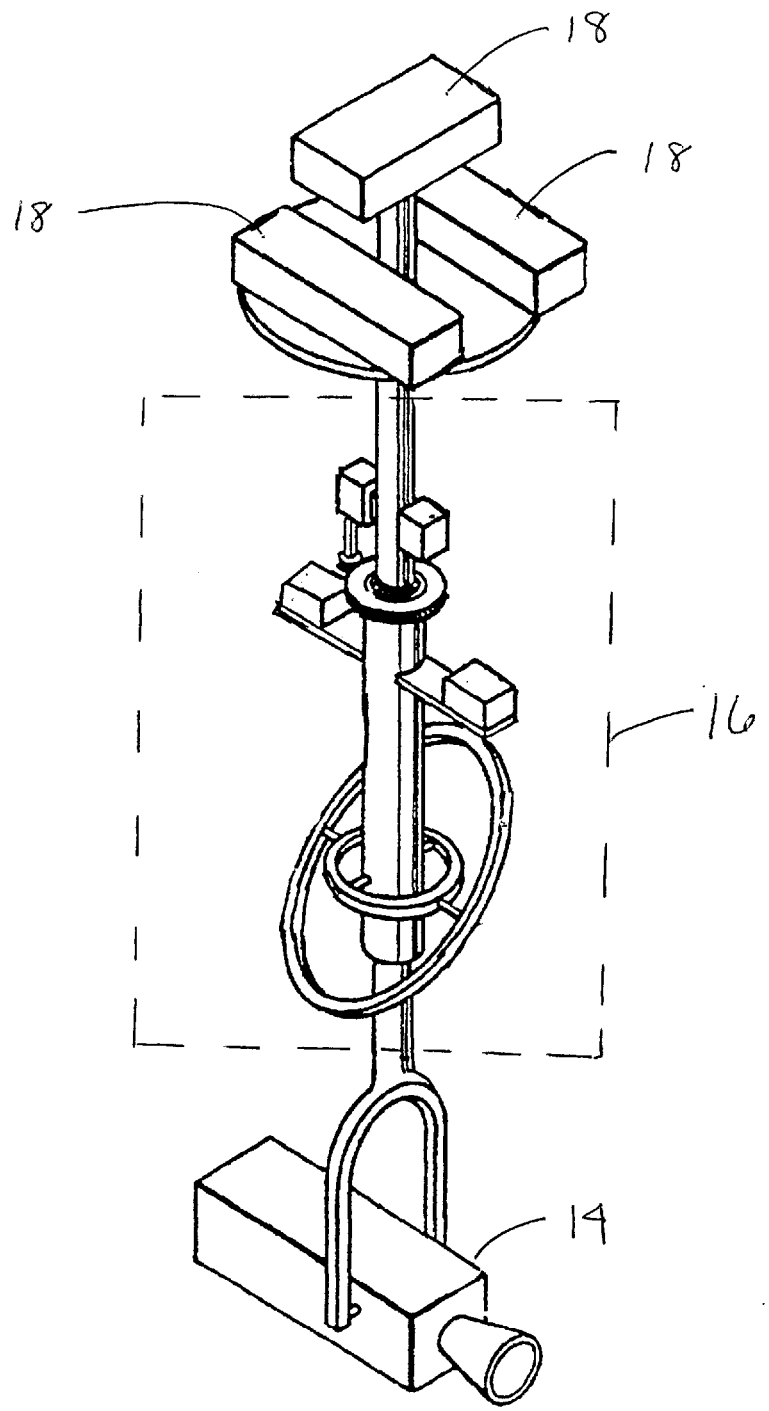
FIG. 2 is a schematic illustrating the camera, movable camera mount, and control electronics within the cover housing.

FIG. 2 is a schematic illustrating the camera 14, movable camera mount 16, and control electronics 18 within the cover housing 12. The camera 14, mount 16, and control electronics 18 are of a type and construction discussed in Brown, U.S. Pat. No. 4,710,819. The control electronics 18 are used to control the focus, position, and power to the camera 14, and thus are electrically connected to the camera 14 through the mount 16.

Figure 3:
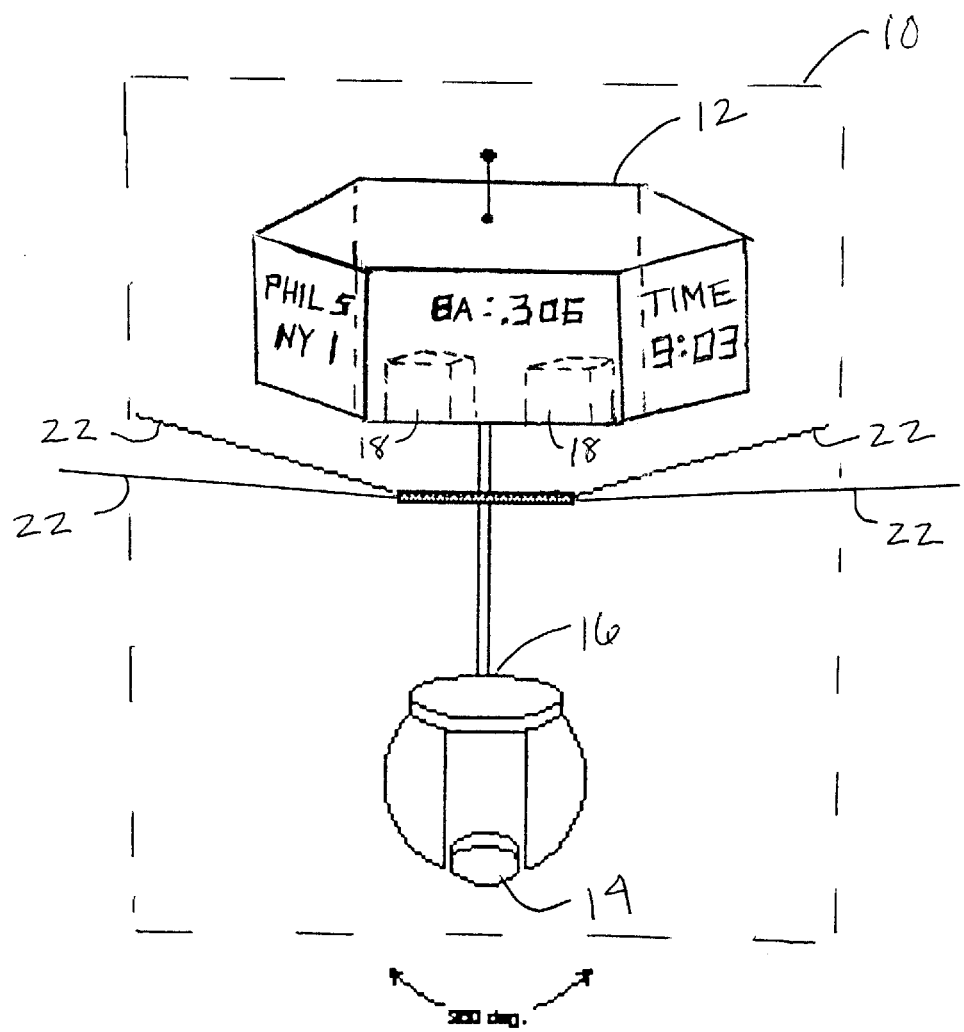
FIG. 3 is a schematic illustrating the camera assembly, wherein the control electronics are housed within a six-sided cover housing.

FIG. 3 is a schematic illustrating the camera assembly 10, wherein the control electronics 18 are housed within an informational cover housing 12. The cover housing 12 shown is six-sided, although the cover housing 12 of this embodiment may be a polygon of any number of sides, and may have a closed top or an open top over the control electronics 18.

The cover housing 12 is a space on which information is provided to spectators. Thus, the cover housing provides a medium for signage and billboard space. The information provided to spectators may be in the form of a constant display, or the display may change. A constant display may be of various types, including but not limited to, a billboard display, a series of bulbs which are lit to form letters or numbers, or an LCD panel display. A changing display may be of various types, including but not limited to, a scrolling display which scrolls information across the cover housing 12 by lighting a series of bulbs in a sequence, a billboard display made up of a series of multi sided tiles, which tiles are turned in unison at given time intervals, thus changing the information displayed on the billboard, or a picture tube used to broadcast different images. The type of information displayed on the cover housing 12 might include, but is not limited to, game score or scores, statistics, or advertising. The information displayed on the cover housing 12 may be controlled by the controlling software.

The cover housing 12 provides protection of the control electronics 18 from the elements. A multi-sided, open top cover housing provides protection from wind and blowing debris, which could cause malfunction of the control electronics 18. A multi-sided, closed top cover housing 12 additionally provides protection from rain or snow, and further provides protection from birds or animals who might otherwise disrupt the operation of the control electronics 18.

The cover housing may provide, in an alternative embodiment, additional stability and balance for the camera assembly. The cover housing is to be positionally maintained at all times such that its bottommost surface is parallel to the ground. This maintenance may be sensed and adjusted using the control electronics 18, or the cover housing may be weighted to constantly maintain a parallel position. Where the cover housing position is sensed by the control electronics 18, the control electronics 18, connected to both the cover housing and the camera mount 16, can also sense the perpendicularity of the camera mount 16 with respect to the ground by sensing the parallel position of the cover housing.

In the embodiment wherein the control electronics 18 sense the perpendicularity of the camera mount 16, a series of adjusters, such as extendable weights or lever arms which may be moved by motors, are provided at the points of connection to the camera mount 14. These adjusters shift the cover housing around on its mount atop the control electronics 18 according to commands from the control electronics 18, thereby providing a weighted yoke which may be used to adjust the position, balance, or stability of the camera mount 16 by shifting the weight atop the camera mount 16. These adjusters may be controlled by the control electronics based in instructions received from the controlling software.

Figure 4:
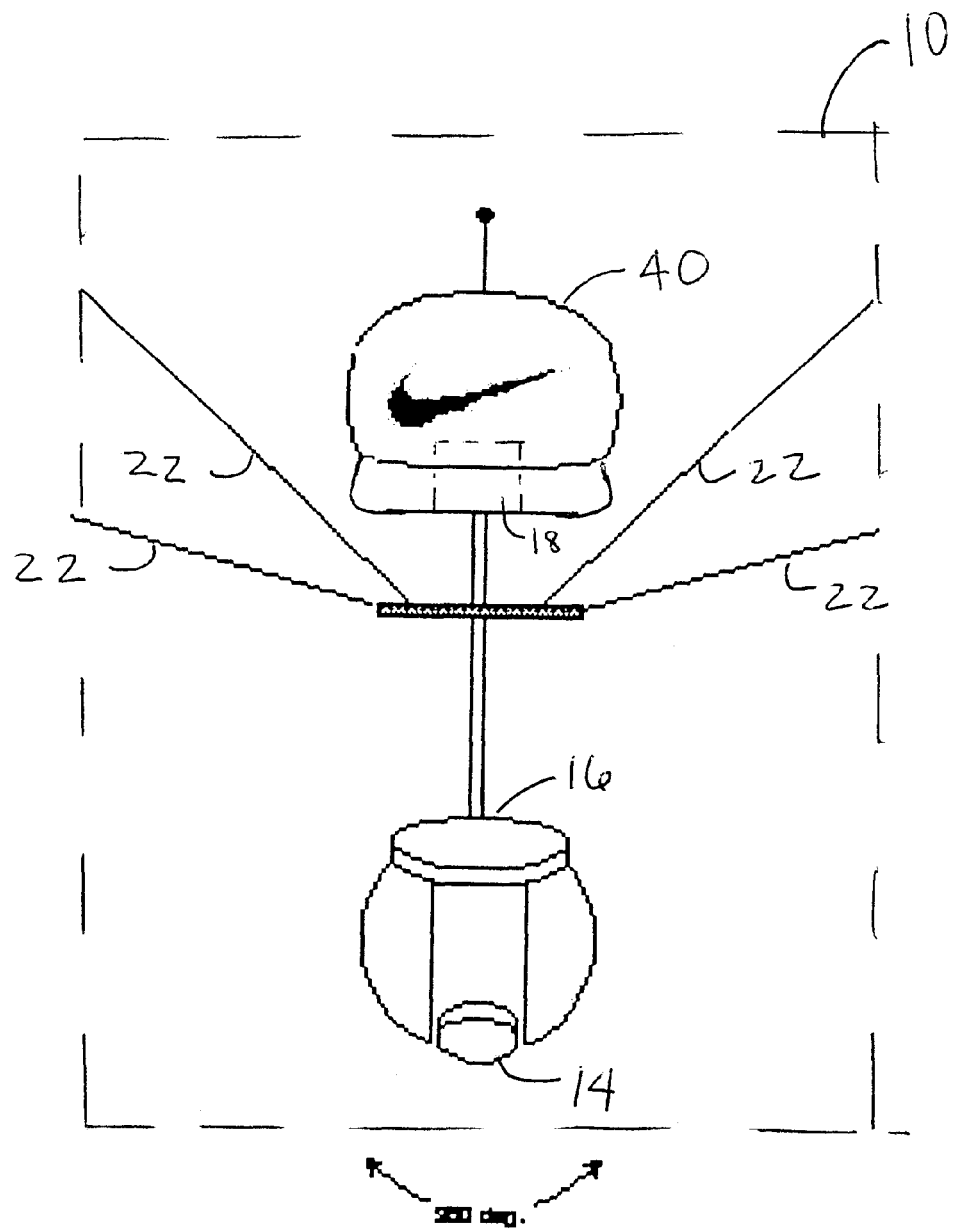
FIG. 4 is a schematic illustrating an alternative embodiment wherein the control electronics are housed within a mold.

FIG. 4 is a schematic illustrating an alternative embodiment wherein the control electronics 18 are housed within a cover housing in the form of a mold 40. In the illustrated embodiment of the present invention, the mold 40 takes the form of a large ball cap having, for example, a Nike® symbol placed thereon. The mold 40 may take other forms related to the sporting event being played, such as a football helmet, or related to an item being advertised, such as a sneaker or a bottle. The mold 40 may take other forms unrelated to the sporting event or to an advertised item, such as a spaceship or airplane which appears to spectators to fly around the stadium when the camera assembly 10 is moved. Alternatively, the mold 40 may be used as a game scoreboard. The mold 40 may be symmetric or assymetric. The mold 40 may be of a size sufficient to cover only the control electronics 18, or may be of a greater size, extending down the camera mount 16 to enclose therein the entire camera mount 16, and may enclose therein the camera 14. The mold 40 is connected to the camera mount 16 in the same manner as the embodiments of the cover housing set forth hereinabove.

In an alternative embodiment, the mold 40 may be retractable, such as an inflatable mold. The retraction or expansion of the mold 40 is then controlled by the controlling software. Multiple molds may be alternately retracted or expanded at different times, offering multiple sets of information for conveyance to spectators without any additional spatial expense.

Those of ordinary skill in the art will recognize that many modifications and variations of the present invention may be implemented. For example, the cover housing may be rotated to offer multiple viewing angles to stationary spectators. Additionally, sound capabilities may be added to the present invention, in the form of a microphone which receives sound from the event for broadcast, or a speaker which generates sound to the spectators at the event. The foregoing description and the following claims are intended to cover all such modifications and variations.

What is claimed is:

1. A three-dimensionally moveable camera system that conveys advertising information to spectators, comprising:
   at least first, second and third elongated flexible members, each having a first end and a second end;
   at least three motor driven reels, wherein one motor driven reel corresponds to one elongated flexible member, and wherein the first end of said first elongated flexible member is extendably and retractably connected to said motor driven reel;
   at least first, second and third equipment support members, wherein said first equipment support member corresponds to said first elongated flexible member, and wherein the second end of said first elongated flexible member is attached to said equipment support member;
   a three-dimensionally moveable camera assembly comprising: a camera, a camera mount having said camera mounted thereon, said camera mount being connected to said equipment support members; a cover, coupled to the mount, that conveys advertising information to spectators in a field of view of said three-dimensionally moveable camera assembly; and control electronics that control at least one angular orientation of said three-dimensionally moveable camera assembly including said cover, wherein said cover is maintained in a desired angular orientation with respect to a ground surface, irrespective of an angular position of said camera with respect to the ground surface and said cover covers said control electronics.

2. The three-dimensionally moveable camera system of claim 1, further comprising a computer-implemented control device, which control device controls the advertising information conveyed to spectators.

3. The three-dimensionally moveable camera system of claim 1, further comprising a computer-implemented control device, which control device controls movement of the three-dimensionally moveable camera assembly.

4. The three-dimensionally moveable camera system of claim 1, wherein said cover takes the form of a mold.

5. The three-dimensionally moveable camera system of claim 1, wherein said cover takes the form of a polygon.

6. The three-dimensionally moveable camera system of claim 1, wherein said cover completely surrounds said control electronics.

7. The three-dimensionally moveable camera system of claim 1, wherein said cover encloses said control electronics and said camera mount.

8. The three-dimensionally moveable camera system of claim 1, wherein the cover includes a liquid crystal display for conveying the information.

9. The three-dimensionally moveable camera system of claim 1, wherein the cover includes a plurality of light bulbs for conveying the information.

10. The three-dimensionally moveable camera system of claim 1, wherein the cover comprises a plurality of light emitting devices for conveying the information.

11. The three-dimensionally moveable camera system of claim 1, wherein the desired angular orientation is a substantially perpendicular orientation with respect to the ground surface.

12. A three-dimensionally moveable camera system that conveys advertising information to spectators, comprising:

at least first, second and third elongated flexible members, each having a first end and a second end;

at least three motor driven reels, wherein one motor driven reel corresponds to one elongated flexible member, and wherein the first end of said first elongated flexible member is extendably and retractably connected to said motor driven reel;

at least first, second and third equipment support members, wherein said first equipment support member corresponds to said first elongated flexible member, and wherein the second end of said first elongated flexible member is attached to said equipment support member;

a three-dimensionally moveable camera assembly comprising: a camera; a camera mount having said camera mounted thereon, said camera mount being connected to said equipment support members; control electronics that control at least one angular orientation of said three-dimensionally moveable camera assembly; and a plurality of light emitting objects coupled to the control electronics, said plurality of light emitting objects conveying advertising information to spectators in a field of view of said three-dimensionally moveable camera assembly.

13. The three-dimensionally moveable camera system of claim 12, wherein the light emitting objects are controllably lit to form letters or numbers.

14. A system that conveys advertising information to spectators, comprising:

at least first, second and third elongated flexible members, each having a first end and a second end;

at least three motor driven reels, wherein one motor driven reel corresponds to one elongated flexible member, and wherein the first end of said first elongated flexible member is extendably and retractably connected to said motor driven reel;

at least first, second and third equipment support members, wherein said first equipment support member corresponds to said first elongated flexible member, and wherein the second end of said first elongated flexible member is attached to said equipment support member;

a three-dimensionally moveable assembly comprising: a mount connected to said equipment support members; a cover, coupled to the mount, that conveys advertising information to spectators in a field of view of said three-dimensionally moveable assembly; and control electronics that control at least one angular orientation of said three-dimensionally moveable assembly including said cover, wherein said cover is maintained in a desired angular orientation with respect to a ground surface, irrespective of an angular position of said moveable assembly with respect to the ground surface and said cover covers said control electronics.

15. The system of claim 14, wherein the desired angular orientation is a substantially perpendicular orientation with respect to the ground surface.

16. A system that conveys advertising information to spectators, comprising:

at least first, second and third elongated flexible members, each having a first end and a second end;

at least three motor driven reels, wherein one motor driven reel corresponds to one elongated flexible member, and wherein the first end of said first elongated flexible member is extendably and retractably connected to said motor driven reel;

at least first, second and third equipment support members, wherein said first equipment support member corresponds to said first elongated flexible member, and wherein the second end of said first elongated flexible member is attached to said equipment support member;

a three-dimensionally moveable assembly comprising: a mount connected to said equipment support members; control electronics that control at least one angular orientation of said three-dimensionally moveable assembly; and a plurality of light emitting objects coupled to the control electronics, said plurality of light emitting objects conveying advertising information to spectators in a field of view of said three-dimensionally moveable assembly.

17. The system of claim 16, wherein the light emitting objects are controllably lit to form letters or numbers.

* * * * *